No. 762,462. PATENTED JUNE 14, 1904.
C. W. ZARING.
HORSESHOE PAD.
APPLICATION FILED MAY 1, 1903.
NO MODEL.
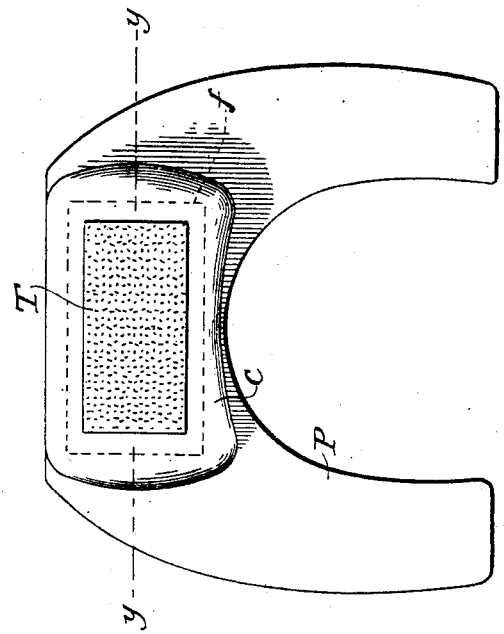
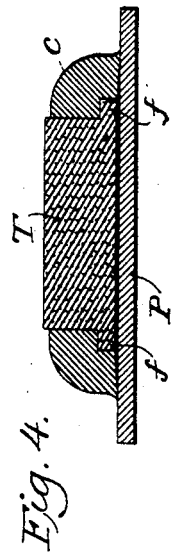
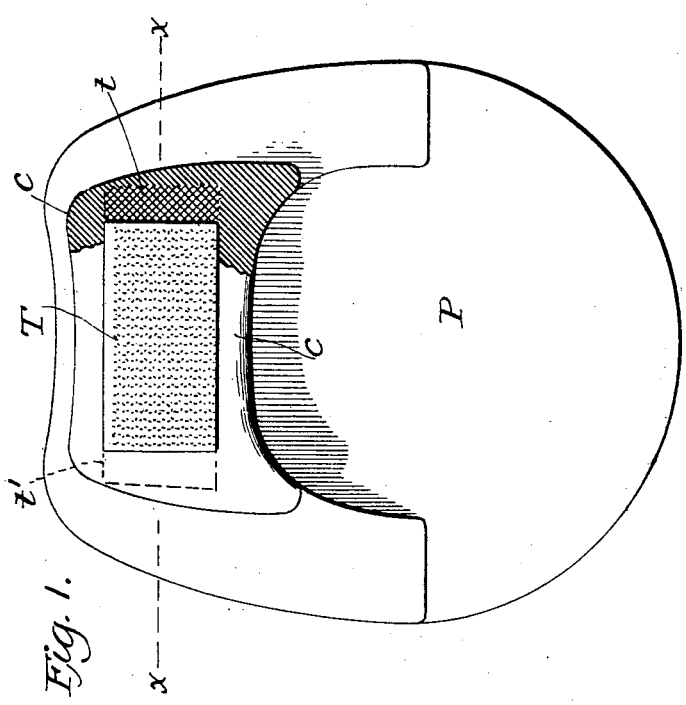
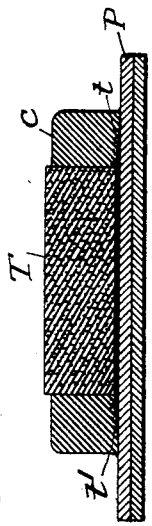
Witnesses
F. N. Roehrich
William H. Crow
Inventor
Charles W. Zaring
By his Attorney
Wm. B. Whitney No. 762,462.

Patented June 14, 1904.

UNITED STATES PATENT OFFICE.

CHARLES W. ZARING, OF NEW YORK, N. Y.

HORSESHOE-PAD.

SPECIFICATION forming part of Letters Patent No. 762,462, dated June 14, 1904.

Application filed May 1, 1903. Serial No. 155,093. (No model.)

*To all whom it may concern:*

Be it known that I, CHARLES W. ZARING, a citizen of the United States, residing in the city of New York, in the county and State of New York, have invented certain new and useful Improvements in Horseshoe-Pads, of which the following is a specification.

Horseshoe-pads consist of a shoe-plate which covers or partly covers the hoof and has on the under side of its heel portion a raised cushion, known as a "frog-cushion," to give an upward elastic pressure against the frog of the foot, and as heretofore constructed and used the plate has been made of rubber or leather or rubber with a backing of leather, and the frog-cushion has been of rubber either made as an integral part of the plate or cemented, sewed, or otherwise attached thereto.

The object of my invention is to provide a pad in which a block of soft tread material which will furnish a durable frictional tread-surface is combined with and firmly secured within the elastic frog-cushion, and this object I accomplish by the construction and arrangement of parts hereinafter described, and illustrated in the accompanying drawings, in which—

Figure 1 is a plan of the under side of a pad with a part of the frog-cushion cut away; Fig. 2, a section on the line $x$ $x$ of Fig. 1; Fig. 3, a plan of the under side of a pad of different shape and showing a modification of my invention, and Fig. 4 a section on the line $y$ $y$ of Fig. 3.

Similar letters refer to similar parts throughout the several figures.

The plate P may be either a full shoe-plate, as shown in Fig. 1, or a heel-plate only, as shown in Fig. 3, or of any desired form and may be made of any suitable material, although I prefer one made of rubber with a backing of leather. To the heel of this plate I cement with rubber (which may be said to form the base of the frog-cushion) the back of a composite tread-block composed of strips or layers of woven fabric, preferably wire-cloth, cut bias or of a number of flexible threads or wires embedded in rubber, and then on the base thus formed I build up the retaining-walls of the rubber cushion, molding them to the plate and to the sides of the tread-block, so that when the pad is finally vulcanized I obtain a structure which is substantially integral. I prefer to place the tread-block so that the edges of the fabric will be exposed and will extend longitudinally with respect to the pad or in case threads or wires are used so that their ends will be presented to the outer or tread surface of the pad, as this arrangement produces the best results both as to wear and friction.

In Figs. 1 and 2 I have shown a tread-block T, in which one or more of the outer strips of fabric on either side $t$ $t'$ project beyond the body of the block and are bent around and embedded in the walls C of the cushion, thereby anchoring the block still more securely within the cushion. These projecting strips may also be sewed down to the plate, if desired, before the walls of the cushion are built up over them. In the modified form shown in Figs. 3 and 4 the tread-block is provided with a flange $t$ around its sides, by means of which it is, in effect, dovetailed into the cushion, and substantially the same effect could be obtained by tapering the sides of the block or by making grooves around them.

In case a leather plate is used the cushion may be built up around the base and sides of the tread-block and vulcanized, and the cushion may then be secured to the plate in any of the ways in which rubber cushions are now secured to such plates.

While I have mentioned rubber as the material used for the cushion and a part or the whole of the plate and as the filling and binding material of the tread-block, I do not wish to limit myself thereto, since it is obvious that rubber compound or any other material having similar cohesive and elastic qualities may be used in its place, and wherever I use the term "rubber" herein I wish to be understood as including therein any equivalent material or compound.

What I claim as new, and desire to secure by Letters Patent, is—

1. In a pad, a plate and a cushion thereon, the said cushion consisting of a backing and retaining side walls of a cohesive material and a tread-block of similar cohesive material and having embedded therein a number of flexible threads or wires so disposed as to present an end to the outer or tread surface, substantially as described.

2. In a pad, a plate with face of cohesive material, a cushion of cohesive material, and composite tread-block, composed of sheets of woven fabric embedded in a cohesive material, set into and secured within said cushion, substantially as described.

3. In a pad, a plate with face of rubber, a rubber cushion thereon, and a tread-block composed of sheets of woven fabric and rubber set into said cushion, the parts being united by vulcanization of the rubber into an integral structure, substantially as described.

4. In a pad, a plate and frog-cushion, the said cushion consisting of a tread-block composed of layers of woven fabric embedded in a cohesive material with an elastic backing and retaining side walls of similar cohesive material, substantially as described.

5. In a pad, a plate and frog-cushion, the said cushion consisting of a composite tread-block with a backing and side walls of rubber vulcanized thereto, substantially as described.

6. In a pad, a plate and frog-cushion, the said cushion consisting of a tread-block, composed of sheets of wire-cloth cut bias and embedded in rubber, and a backing and retaining side walls of rubber vulcanized thereto, substantially as described.

7. In a pad, a plate and frog-cushion, the said cushion consisting of a tread-block, composed of sheets of woven fabric filled in and between with a cohesive material, and surrounding retaining-walls in which are embedded the projecting edges of one or more of said sheets of woven fabric, substantially as described.

8. In a pad, a plate and frog-cushion, the said cushion consisting of a tread-block, composed of sheets of wire-cloth cut bias and filled in and between with rubber and having one or more of said sheets, on each side, projecting beyond its body, a backing and retaining side walls, in which are embedded the projecting edges of said sheets of wire-cloth, of rubber, the parts of said cushion being vulcanized into an integral structure, substantially as described.

In testimony whereof I have hereunto affixed my signature in presence of two witnesses.

CHARLES W. ZARING.

Witnesses:
WM. B. WHITNEY,
WALTER F. CARTER.